United States Patent [19]

Gast

[11] 4,408,848

[45] Oct. 11, 1983

[54] APPARATUS FOR INDICATING A LINE AND FOR PRODUCING AND VISUALLY DISPLAYING AN IMAGE OF A LINE INDICATOR

[76] Inventor: Fred C. Gast, 209 W. El Bonito Dr., Ocean Springs, Miss. 39564

[21] Appl. No.: 844,439

[22] Filed: Oct. 21, 1977

[51] Int. Cl.³ .................... G03B 21/00; G03B 21/10
[52] U.S. Cl. ........................................ 353/11; 33/1 R; 33/1 N
[58] Field of Search .................. 353/11, 12, 40, 41, 353/42, 44, 76; 33/1 SD, 1 SB, 76 VA, 78, 80, 86, 1 R, 298; 35/12 F; 73/178; 340/24, 27 NA; 235/61 NV; 116/130

[56] References Cited

U.S. PATENT DOCUMENTS

| | | | |
|---|---|---|---|
| 2,169,532 | 8/1939 | Jensen | 33/80 |
| 2,696,610 | 12/1954 | Turley | 33/1 R |
| 3,393,457 | 7/1968 | Freda | 33/78 |
| 3,696,671 | 10/1972 | Steigleder et al. | 353/11 |
| 3,786,568 | 1/1974 | Schulte et al. | 33/86 |
| 3,865,477 | 2/1975 | Gast | 353/11 |

*Primary Examiner*—John W. Sheppard
*Attorney, Agent, or Firm*—L. S. Van Landingham, Jr.

[57] ABSTRACT

Line indicating apparatus is provided which is capable of suspending an elongated line indicator whereby it is movable in a direction substantially perpendicular to its linear axis, and is rotatable around a second axis which is angularly disposed with respect to the linear axis and the said direction of movement. A plurality of the basic apparatus may be arranged in a superimposed relationship, and the resultant plurality of superimposed line indicators may be individually moved and/or rotated to positions wherein they are angularly disposed with respect to each other. Preferably, the line indicators are movable and rotatable in closely adjacent fixed planes so that a substantially distortion-free image thereof may be produced and visually displayed.

The line indicating apparatus is especially useful in navigational charting or plotting, and in navigational devices pertaining thereto. The apparatus is also useful in impressing one or more line indicators or images thereof on or closely adjacent the surface of a chart or chart image, or on visual display devices in general including radar screens or scopes, rear image projectors, and other types of projection systems. In a further embodiment, apparatus is provided for producing and visually displaying an image of a line indicator, such apparatus being suitable for the aforementioned as well as other purposes.

28 Claims, 15 Drawing Figures

APPARATUS FOR INDICATING A LINE AND FOR PRODUCING AND VISUALLY DISPLAYING AN IMAGE OF A LINE INDICATOR

THE BACKGROUND OF THE INVENTION

1. The Field of the Invention

The present invention broadly relates to improved apparatus for indicating a line, and in a preferred embodiment, to apparatus for indicating a plurality of lines, each of which is capable of being separately moved and rotated. In another embodiment, the invention is concerned with apparatus for producing and visually displaying one or more images of a line indicator or indicators.

2. The Prior Art

The large amount of equipment and material needed in the traditional navigation of aircraft and watercraft by manual techniques results in substantial expense to the operator. For example, the navigational aids used by a navigator in manual plotting may include an inventory of numerous paper or cloth mounted charts of substantial size, a chart table large enough to provide a working surface therefor, transparent overlays for the charts, parallel rules, straight edges, dividers, protractors, lead pencils, grease pencils and pens. It is costly initially to buy such a large amount of equipment, and it is also costly to provide the auxiliary equipment and facilities necessary to use the equipment and maintain it in good condition. For instance, sufficient working space must be provided for the navigator to set up the chart table and perform his duties, and storage facilities must be provided when the equipment is not in use. Additionally, some provision must be made for navigation during storms, and often special foul weather gear and equipment is needed.

It is apparent from the above that navigation by traditional manual means requires a large amount of space, and thus usually is not practical when navigating small private airplanes and pleasure boats. The economic factors also must be given consideration and especially with small privately owned aircraft and boats where expenses must be kept under control. Even with the larger craft and where expense is not a problem, the amount of space available to the navigator is very limited and it is difficult for the navigator to perform his duties.

The primary purpose of traditional navigational charting or plotting is to allow the navigator to determine his position on an appropriate chart by manually drawing or plotting thereon one or more lines-of-position. Such lines-of-position may be obtained from traditional sources such as celestial fixes, polaris sightings, radio direction finder bearings, radar, Loran, and by visual bearings of known points on the chart. One line-of-position often is not sufficient to allow the navigator to accurately determine his position, and usually it is necessary to manually plot on the chart surface or transparent overlay at least two, and preferably at least three, lines-of-position. This procedure is time consuming under the best of working conditions. Moreover, the working conditions available to the navigator often are not adequate, and this tends to further increase the amount of time required as well as the accuracy of the results. In instances where the aircraft or watercraft is moving rapidly, it is desirable that the lines-of-position be obtained and plotted in the shortest practical period of time in order to obtain an accurate fix. This is not possible in many instances when using the traditional prior art equipment and manual practices.

It is apparent from the foregoing that the art has long sought a small reliable navigational device which assures rapid and accurate navigational plotting in a confined space under both good and bad weather conditions, and which is also inexpensive to buy, operate and maintain. My U.S. Pat. No. 3,865,477, issued Feb. 11, 1975, the disclosure of which is incorporated herein by reference, discloses and claims a navigational device which overcomes many of the aforementioned problems of the prior art. Nevertheless, further research in this field has resulted in additional improvements which are embraced by the subject matter to be disclosed and discussed more fully hereinafter. Such further improvements are especially useful in navigating with prior art apparatus having means to visually display a chart image, including the navigational device disclosed in U.S. Pat. No. 3,865,477. These improvements also are useful in navigating with a conventional paper or cloth-mounted chart.

THE SUMMARY OF THE INVENTION

The present invention provides line indicating apparatus which is capable of suspending an elongated line indicator whereby it is movable in a direction substantially perpendicular to its linear axis, and whereby it is also separately rotatable around a second axis which is angularly disposed with respect to the linear axis and the direction of movement perpendicular thereto. A plurality of the basic line indicating apparatus may be nestled in a superimposed relationship, and the resultant superimposed line indicators may be individually moved and/or separately rotated to positions whereby they are angularly disposed with respect to each other. By means of the aforementioned apparatus, it is possible for the first time to rapidly provide and impress one or more line indicators or images thereof on a chart or chart image, or on the screens of visual display devices in general including radar scopes, rear image projectors, and other types of visual projection systems. It is also possible to determine the compass bearing from one point on a chart or chart image to another point thereon by simply (a) superimposing the line indicator or image thereof on the two points, (b) moving the line indicator in a direction perpendicular to its linear axis until it assumes a position over the center of the display screen, and (c) then reading the bearing on a compass rose around the perimeter of the display screen. The line indicating apparatus also allows lines-of-position to be imposed on a chart or chart image using bearings obtained from traditional sources. The combination of two or more lines-of-position angularly disposed with respect to each other allows the navigator to determine his position accurately and without the need for manually drawing lines on a chart or chart image. The navigator may perform these functions rapidly and in a limited amount of space by merely turning control knobs on a visual display device which includes the line indicating apparatus of the invention. It is possible to navigate without leaving the controls of an aircraft or watercraft in such instances.

A BRIEF DESCRIPTION OF THE ACCOMPANYING DRAWINGS

The invention will be described hereinafter in greater particularity with reference to the presently preferred embodiments thereof illustrated in the accompanying drawings, wherein.

THE DETAILED DESCRIPTION OF THE INVENTION INCLUDING THE PRESENTLY PREFERRED EMBODIMENTS THEREOF

Figure 1:
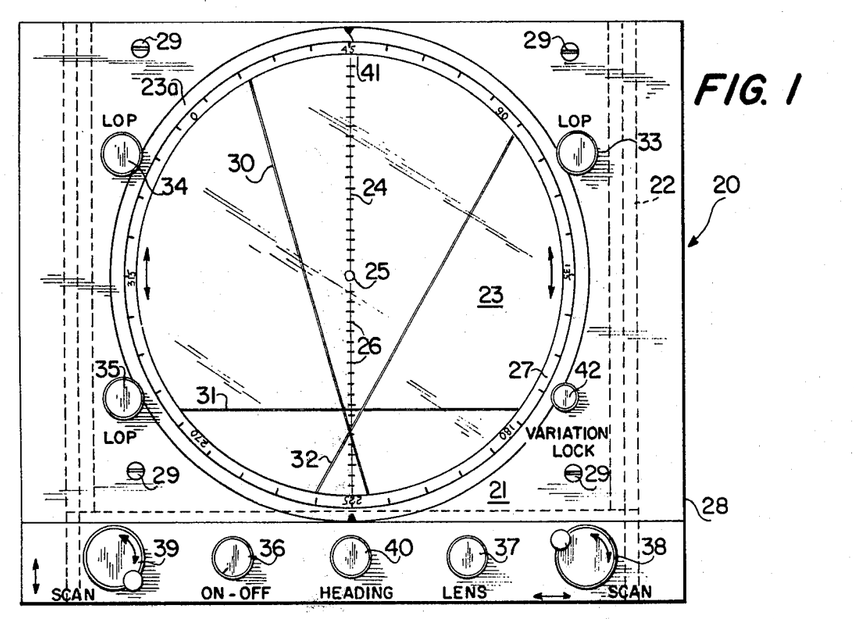
FIG. 1 is a front view in elevation of apparatus for producing and visually displaying an image of a line indicator, such apparatus including the line indicating apparatus of the invention.
Figure 2:
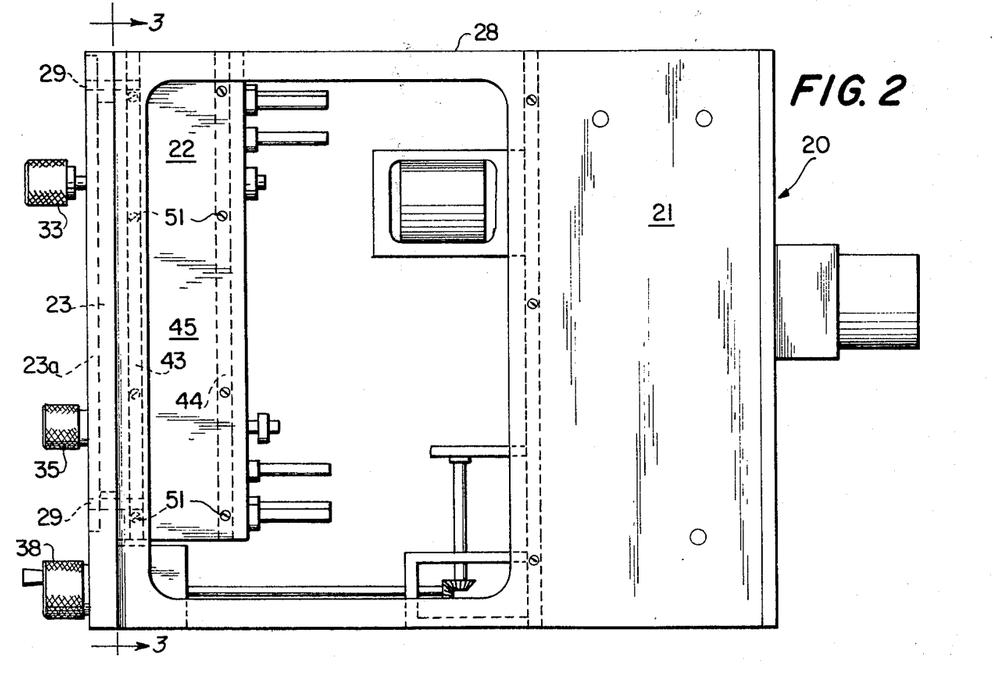
FIG. 2 is a side view in elevation of FIG. 1.

Referring now to the drawings, and more particularly to FIGS. 1 and 2, the navigational device 20 includes a rear image projector 21 which has the line indicating apparatus 22 of the invention mounted therein closely adjacent the visual display screen 23. Prior to modification by installing the line indicating apparatus 22 therein, the basic rear image projector 21 may be of a suitable prior art design which is capable of producing an image of a navigational chart and projecting the chart image onto the visual display screen 23. One example of a suitable rear image projector is disclosed in FIGS. 1-7 of my U.S. Pat. No. 3,865,477, the disclosure of which is incorporated herein by reference. The basic rear image projector disclosed in FIGS. 1-7 of U.S. Pat. No. 3,865,477 may be modified by installing the line indicating apparatus 22 of the present invention immediately behind the visual display screen thereof, and if desired the means associated therewith for indicating lines of position may be removed as it is no longer needed.

The rotatable visual display screen 23 is of a conventional round configuration and has a vertical course line 24 projected thereon or inscribed on a thin transparent overlay 23-a which is fixedly mounted thereover on frame 28. The course line 24 passes through the center axis 25 and is subdivided into units of a desired length by means of a plurality of equidistant transversely extending lines 26. The screen 23 has a compass rose 27 mounted around the periphery thereof which is subdivided into 360° and rotatable with screen 23.

The line indicating apparatus 22 is mounted within the interior of supporting frame 28 by means of screws 29 and is arranged whereby the line indicators 30, 31 and 32 are immediately behind the screen 23 and thus in substantially the same focal plane. As will be discussed more fully hereinafter, the line indicators 30, 31 and 32 are individually movable in a direction perpendicular to their linear axes, and are separately rotatable around the center axis 25 by rotation of control knobs 33, 34 and 35, respectively.

The navigational device 20 is also provided with an on-off switch 36, a lens control knob 37, a horizontal scan control knob 38 whereby the chart image may be moved back and forth horizontally on screen 23, and a vertical scan control knob 39 whereby the chart image may be moved up and down to a desired vertical position on screen 23, and a heading control knob 40 whereby the screen 23 and compass rose 27 are rotated and the course of the aircraft or water craft is indicated on compass rose 27 by pointer 41. A variation lock control knob 42 is also provided to enable the compass rose 27 to be adjusted and thereby compensate for magnetic variations. Reference may be had to the aforementioned U.S. Pat. No. 3,865,477 for other details of construction of the basic rear image projector 21, the controls therefor including switch 36 and knobs 37, 38, 39, 40 and 42, and the general operation of navigational device 20.

The navigational device 20 is sufficiently small to be portable, and if desired, it may be mounted near the controls of an aircraft or watercraft and operated without the need for leaving the controls for navigation purposes. While the navigational device 20 is especially adapted for small aircraft and watercraft, its usefulness is not limited thereto as it is equally suitable for use with large aircraft and watercraft, or for use in other environments where positional information is needed or required, such as for example in field survey work, search and rescue work, and the like. Additionally it is understood that the various moving elements or components and/or the controls may be motorized, automatically moved or controlled, or remotely moved or controlled.

Figure 3:
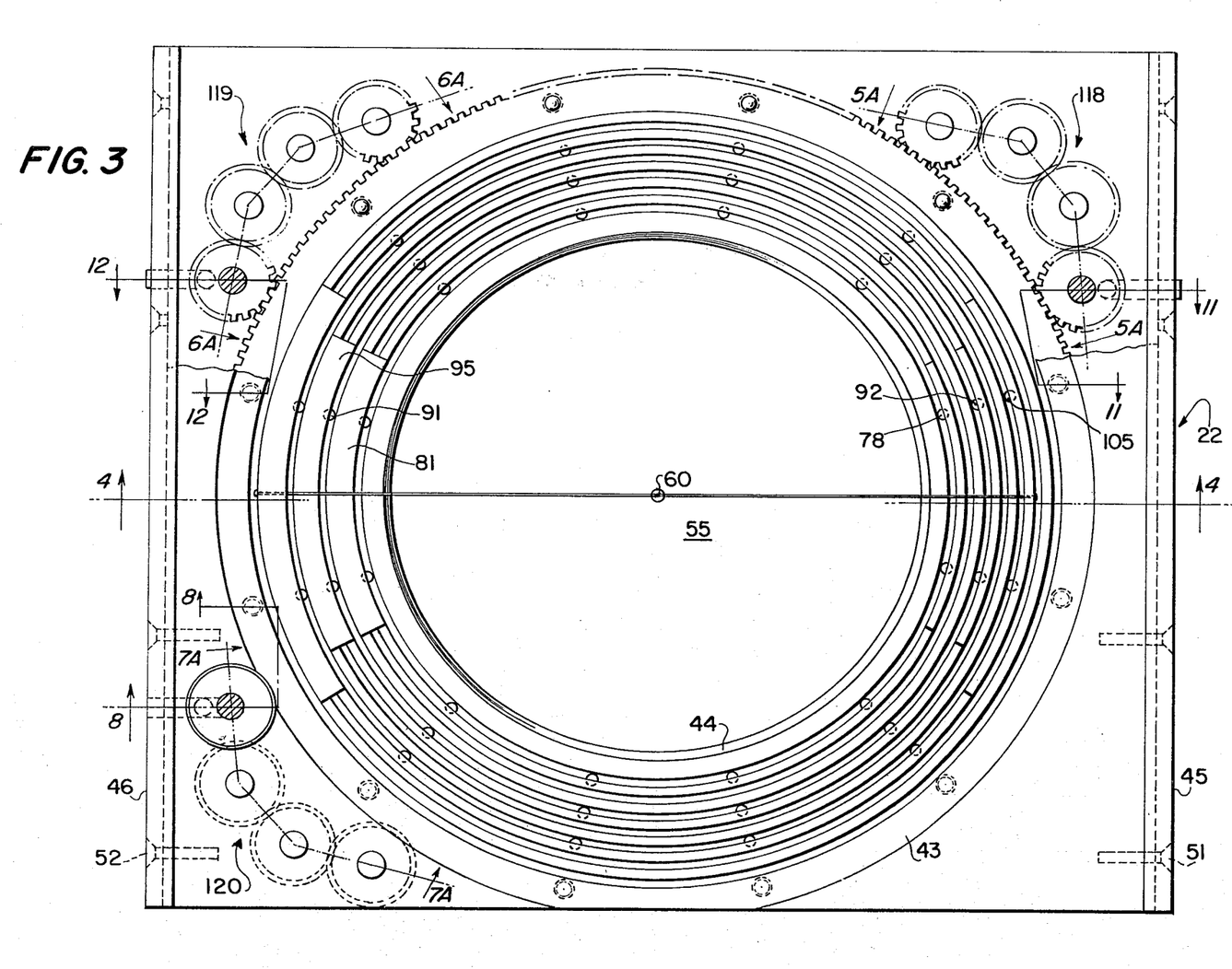
FIG. 3 is a top view of the line indicating apparatus of the invention taken along the line 3—3 of FIG. 2.
Figure 4:
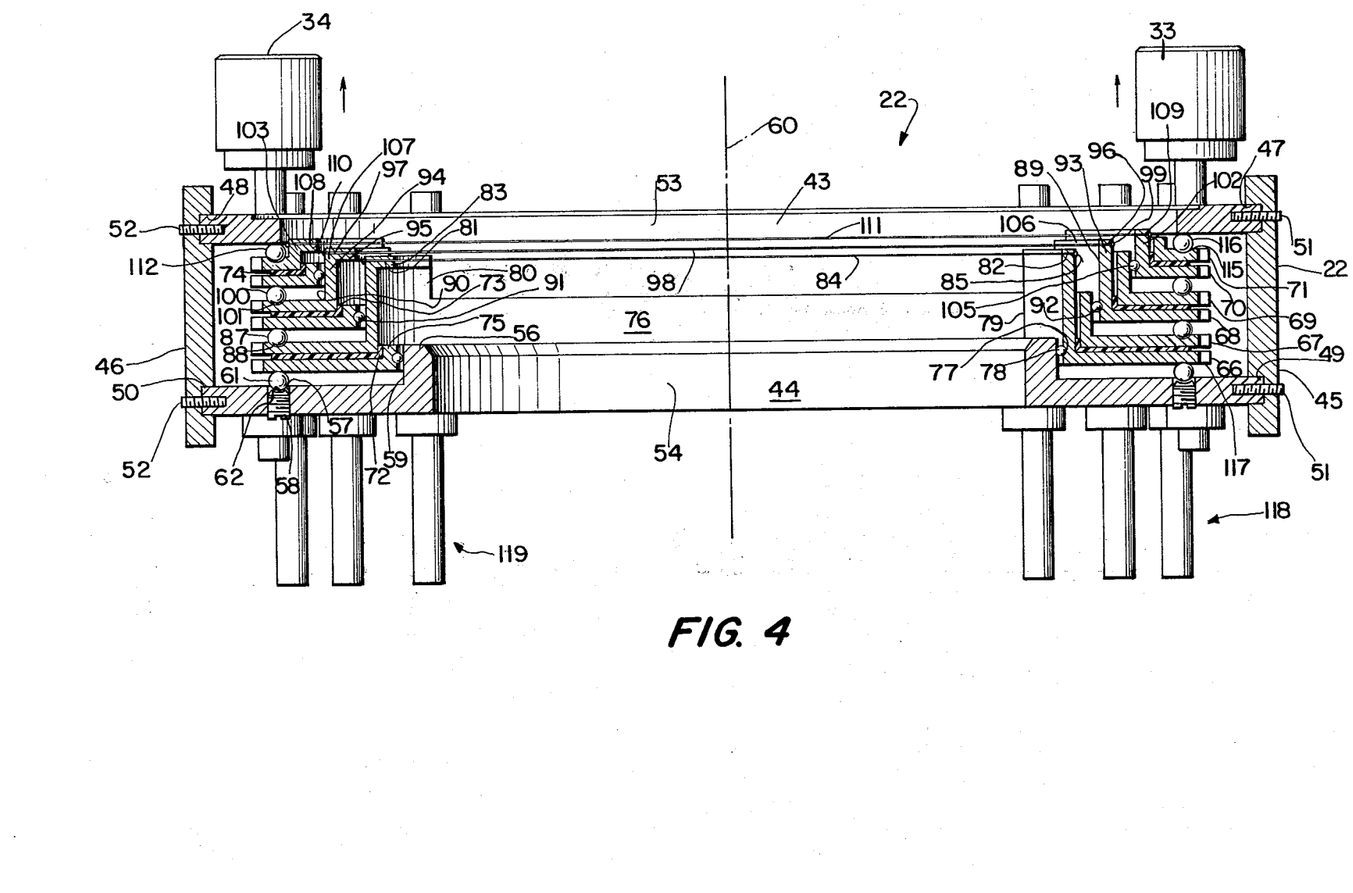
FIG. 4 is a cross-sectional view in elevation of the line indicating apparatus of the invention taken along the line 4—4 of FIG. 3.

The line indicating apparatus of the invention will be described in detail hereinafter. Referring now to FIGS. 3 and 4 of the drawings, the line indicating apparatus 22 is illustrated detached from the navigational device 20 in the interest of clarity and simplifying the drawings. The line indicating apparatus 22 includes a top plate 43, a bottom plate 44, a right side plate 45 and a left side plate 46. The right and left side plates 45 and 46 are provided at their respective upper ends with slots 47 and 48 of a suitable depth and width to receive the right and left ends, respectively, of top plate 43. Similarly, the right and left side plates 45 and 46 are provided with lower slots 49 and 50, respectively, of a suitable width and depth to receive the respective right and left ends of bottom plate 44. A plurality of screws 51 are provided to securely retain the right ends of top plate 43 and bottom plate 44 in slots 47 and 49, respectively. Similarly, a plurality of screws 52 are provided for securely retaining the left ends of top plate 43 and bottom plate 44 in slots 48 and 50, respectively. This arrangement assures that top plate 43 and bottom plate 44 are retained in the exact spaced relationship required for proper support of the remaining component parts of the line indicating apparatus 22.

The top plate 43 and the bottom plate 44 have annular openings 53 and 54, respectively, formed therein which are arranged in a superimposed relationship whereby a visually unobstructed area 55 is provided when the line indicating apparatus 22 is viewed from either the top or the bottom. The bottom plate 44 is also provided with an annular lip 56 and a series of twelve threaded openings 57 of a diameter to receive cup pointed set screws 58. The annular openings 53 and 54, and the annular surface 59 of lip 56 all have a common axis which is indicated by the point 60. Thus, all points taken along the annular surface of opening 53 are equidistant from the common axis or point 60. Similarly, all points taken along the annular surface of opening 54 and along the surface 59 of lip 56 are equidistant from the common axis or point 60. The openings 57 are positioned in the form of a circle and whereby they are equidistant along the circumference of the circle, and also equidistant from the common axis or point 60. The diameters of openings 57 are slightly larger than the diameters of precision ball-bearings 61. The internal ends of set screws 58 have cup shaped depressions 62 formed therein which are semicircular in cross-section and of a diameter to receive the lower edges of ball-bearings 61 and thereby provide seats for the easy rotation thereof.

A lower or inner pair of cooperating circular frames 66 and 67, a middle or intermediate pair of cooperating circular frames 68 and 69, and an upper or outer pair of cooperating circular frames 70 and 71 are rotatably mounted between the upper and lower plates 43 and 44 are arranged in a superimposed nestled relationship for rotation about the common axis 60. Nylon bushings 72, 73 and 74 separate frames 66 and 67, 68 and 69, and 70 and 71, respectively, and allow the respective pairs of cooperating frames to be easily rotated either co-currently or countercurrently.

The lower surface of frame 66 rests upon ball bearings 61 whereby the weight of the assembled superimposed frames 66–71 is supported by plate 44. The cooperating frames 66 and 67 are provided with annular lips 75 and 76, respectively, which extend upward and are spaced by nylon bushing 72. The annular inner surface of lip 75 is provided with a series of equidistant annular depressions 77 which are of a suitable diameter and depth to provide seats for the outer edges of precision ball bearings 78 and thereby allow easy rotation of frames 66 and 67 around surface 59. The annular lips 75 and 76 are provided with semiannular upright projections 79 and 80, respectively, of substantially equal radii and height. The upper end of projection 80 is further provided with a semiannular projection 81 which extends inwardly a distance sufficient to be directly above the inner surface of lip 75. The outer ends of projections 79 and 80 have openings 82 and 83, respectively, which receive and support the ends of an elastic line indicator 84 at substantially the same height. The ends of line indicator 84 are retained in openings 82 and 83 by means of enlarged end portions 85. It will be recognized that due to the inner end of projection 81 being positioned directly above the inner surface of lip 75, the suspended portion of the line indicator 84 between the inner end of projection 81 and the common axis 60 will be exactly the same length as the suspended portion of the line indicator 84 between the inner surface of projection 79 and the common axis 60. Thus, the inner surface of the projection 81 and the inner surface of projection 79 are equidistant from the common axis 60, and the line indicator 84 is suspended whereby the common axis 60 is equidistant from the suspended ends thereof. This arrangement allows the line indicator 84 to be moved in a direction perpendicular to its linear axis on countercurrent rotation of annular frames 66 and 67 around common axis 60, and also allows the line indicator 84 to be rotated around the common axis 60 upon co-rotation of annular frames 66 and 67 around common axis 60. The change in length of line indicator 84 during rotation of frames 66 and 67 is compensated for by the elastic nature thereof, whereby the line indicator 84 is maintained tautly suspended between the projections 79 and 80.

The lower surface of frame 68 rests upon ball bearings 87 which are rotatably seated in annular depressions 88 in the upper surface of frame 67. The depressions 88 and the ball bearings 87 seated therein are arranged in a circular fashion, and are substantially equidistant around the circumference of the circle and also substantially equidistant from the common axis 60. The ball bearings 87 are of sufficient diameter to rotatably space frame 68 above frame 67. The cooperating frames 68 and 69 are provided with annular lips 89 and 90, respectively, which extend upward and are spaced by nylon bushing 73. The annular inner surface of lip 89 is provided with a series of equidistant annular depressions 91 which are of a suitable diameter and depth to provide seats for the outer edges of precision ball bearings 92 and thereby allow easy rotation of frames 68 and 69 around frame 67. The annular lips 89 and 90 are provided with semiannular upright projections 93 and 94, respectively, of substantially equal radii and height. The upper end of projection 94 is further provided with a semiannular projection 95 which extends inwardly a distance sufficient to be directly above the inner surface of lip 89. The other ends of projections 93 and 94 have openings 96 and 97, respectively, which receive and support the ends of an elastic line indicator 98 at substantially the same height. The ends of line indicator 98 are retained in openings 96 and 97 by means of enlarged end portions 99. It will be recognized that due to the inner end of projection 95 being positioned directly above the inner surface of lip 89, the suspended portion of the line indicator 98 between the inner end of projection 95 and the common axis 60 will be exactly the same length as the suspended portion of the line indicator 98 between the inner surface of projection 93 and the common axis 60. Thus, the inner surface of the projection 95 and the inner surface of projection 93 are equidistant from the common axis 60, and the line indicator 98 is suspended whereby the common axis 60 is equidistant from the suspended ends thereof. This arrangement allows the line indicator 98 to be moved in a direction perpendicular to its linear axis on countercurrent rotation of annular frames 68 and 69 around common axis 60, and also allows the line indicator 98 to be rotated around the common axis 60 upon co-rotation of annular frames 68 and 69 around the common axis 60. The change in length of line indicator 98 during rotation of frames 68 and 69 is compensated for by the elastic nature thereof whereby the line indicator 98 is maintained tautly suspended between the projections 93 and 94. It will also be noted that the relative height of projections 79, 80, 93 and 94 is such that line indicators 84 and 98 are suspended horizontally in a closely adjacent relationship.

The lower surface of frame 70 rests upon ball bearings 100 which are rotatably seated in annular depressions 101 in the upper surface of frame 69. The depressions 101 and the ball bearings 100 seated therein are arranged in a circular fashion, and are substantially equidistant around the circumference of the circle and also substantially equidistant from the common axis 60. The ball bearings 100 are of sufficient diameter to rotatably space frame 70 above frame 69. The cooperating frames 70 and 71 are provided with annular lips 102 and 103, respectively, which extend upward and are spaced by nylon bushing 73. The annular inner surface of lip 102 is provided with a series of equidistant annular depressions 104 which are of a suitable diameter and depth to provide seats for the outer edges of precision ball bearings 105 and thereby allow easy rotation of frames 70 and 71 around frame 67. The annular lips 102 and 103 are provided with semiannular upright projections 106 and 107, respectively, of substantially equal radii and height. The upper end of projection 107 is further provided with a semiannular projection 108 which extends inwardly a distance sufficient to be directly above the inner surface of lip 102. The other ends of projections 106 and 107 have openings 109 and 110, respectively, which receive and support the ends of an elastic line indicator 111 at substantially the same height. The ends of line indicator 111 are retained in openings 109 and 110 by means of enlarged end portions 112. It will be recognized that due to the inner end of projections 108 being positioned directly above the inner surface of lip 102, the suspended portion of the line indicator 111 between the inner end of projection 108 and the common axis 60 will be exactly the same length as the suspended portion of the line indicator 111 between the inner surface of projection 106 and the common axis 60. Thus, the inner surface of the projection 108 and the inner surface of projection 106 are equidistant from the common axis 60, and the line indicator 111 is suspended whereby the common axis 60 is equidistant from the suspended ends thereof. This arrangement allows the line indicator 111 to be moved in a direction perpendicular to its linear axis on countercurrent rotation of annular frames 70 and 71 around common axis 60, and also allows the line indicator 111 to be rotated around the common axis 60 upon co-rotation of annular frames 70 and 71 around the common axis 60. The change in length of line indicator 111 during rotation of frames 70 and 71 is compensated for by the elastic nature thereof whereby the line indicator 111 is maintained tautly suspended between the projections 106 and 107. It will also be noted that the relative height or projections 93, 94, 106 and 107 is such that line indicators 98 and 111 are suspended horizontally in a closely adjacent relationship.

The upper surface of frame 71 is provided with annular depressions 115 in which ball bearings 116 are rotatably seated. The depressions 115 and ball bearings 116 seated therein are arranged in a circular fashion, and are substantially equidistant around the circumference of the circle and also substantially equidistant from the common axis 60. The ball bearings 116 are of a sufficient diameter to rotatably space frame 71 from plate 43. It may be noted that ball bearings 61, 87, 100 and 116 are arranged in a superimposed relationship whereby set screws 58 may be adjusted as necessary to retain frames 66–71 between plates 43 and 44 in a rotatable but close fitting relationship and prevent vertical movement therebetween of sufficient magnitude to cause indicator lines 84, 98 and 111 to contact one another.

Referring now to FIGS. 3–8, 11 and 12 of the drawings, the peripheral edges of annular frames 66–71 are provided with gear teeth 117 around the circumference thereof. The apparatus 22 is also provided with a gear cluster generally designated as 118 for rotating the outer pair of cooperating frames 70 and 71, a gear cluster generally designated as 119 for rotating intermediate frames 68 and 69, and a gear cluster generally designated as 120 for rotating the inner pair of frames 66 and 67. The arrangement and operation of each of the gear clusters 118, 119, and 120 will be discussed hereinafter.

Figure 5A:
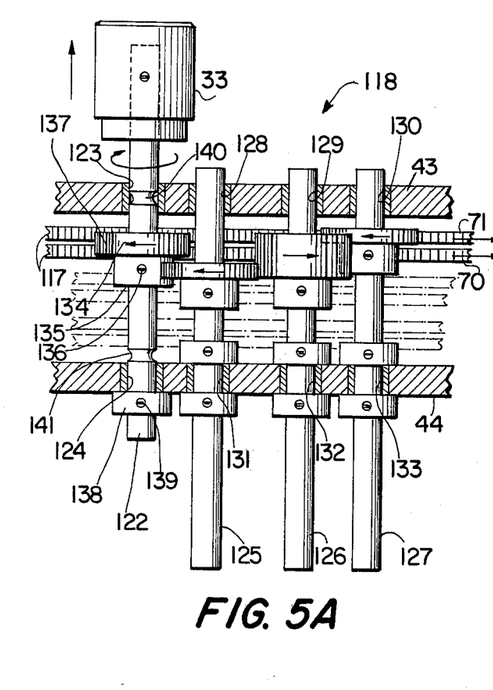
FIG. 5A is a fragmentary cross-sectional view in elevation taken along the line 5A—5A of FIG. 3 and illustrating the control knob in the "out" position.
Figure 5B:
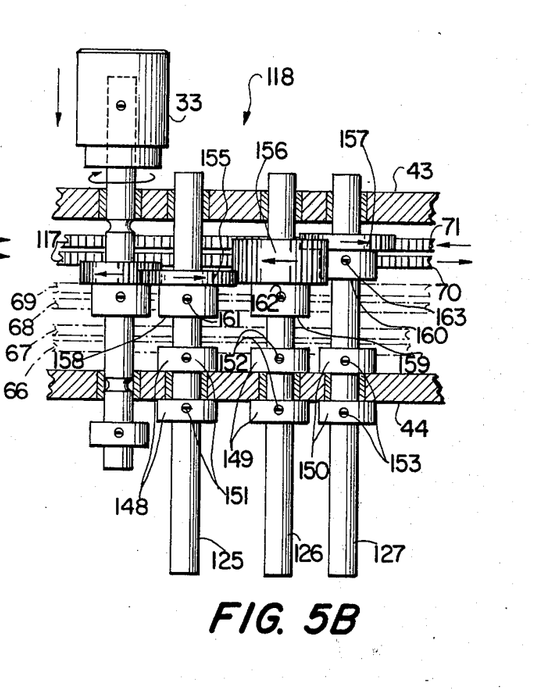
FIG. 5B is a view similar to FIG. 5A, with the exception of illustrating the control knob in the "in" position.
Figure 11:
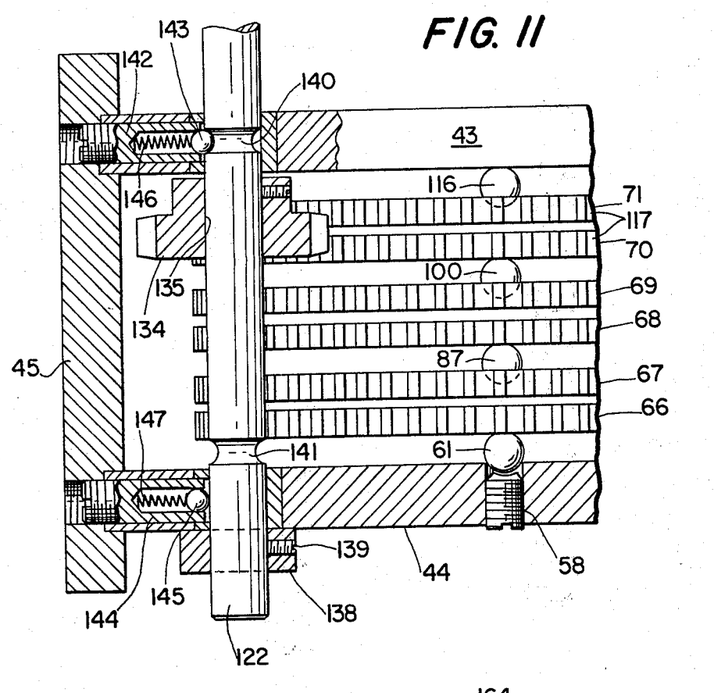
FIG. 11 is a fragmentary cross-sectional view in elevation taken along the line 11—11 of FIG. 3.

Referring now to FIGS. 5A, 5B and 11, the gear cluster 118 includes a drive gear shaft 122 rotatably mounted in openings 123 and 124 in plates 43 and 44, respectively, and 3 additional gear shafts 125, 126 and 127 rotatably mounted in spaced openings 128, 129 and 130 in plate 43 and spaced openings 131, 132 and 133 in plate 44, respectively. The drive gear shaft 122 is provided with a drive gear 134 having an opening 135 therein to receive shaft 122 and allow vertical adjustment. The drive gear 134 is provided with a set screw 136 for retaining it on gear shaft 122 in a desired position. The drive gear 134 has gear teeth 137 which, depending upon the position of gear shaft 122, are in a meshed driving relationship with the gear teeth 117 on both of frames 70 and 71, as shown in FIGS. 5A and 11, or in a meshed driving relationship only with the gear teeth 117 on frame 70, as illustrated in FIG. 5B. The shaft 122 has a control knob 33 mounted on the upper or outer end thereof, and a collar 138 provided with a set screw 139 for retaining it in the illustrated position. The shaft 122 is also provided with upper and lower annular recesses 140 and 141, respectively. A spring urged ball plunger 142 having a retaining ball 143 is mounted in plates 43 and 45, and a similar ball plunger 144 having a retaining ball 145 is mounted in plates 44 and 45. When the shaft 122 is moved to the up or outer position illustrated in FIG. 5A, the retaining ball 143 is urged by spring 146 into annular recess 140 thereby retaining the shaft 122 in the outer position. Similarly, when the shaft 122 is moved to the down or in position illustrated in FIG. 5B, the spring 147 urges ball 145 into annular recess 141 and retains shaft 122 in this position.

The gear shafts 125, 126 and 127 are provided with spaced pairs of collars 148, 149 and 150 which are retained in the illustrated positions by set screws 151, 152 and 153, respectively, and prevent inner or outer movement of shafts 125, 126 and 127. Gears 155, 156 and 157 have openings 158, 159 and 160, therein for adjustably receiving shafts 125, 126 and 127 respectively. The gears 155, 156 and 157 are provided with set screws 161, 162 and 163, for retaining the same on shafts 125, 126 and 127, respectively.

As is best seen in FIGS. 5A and 11, the drive gear 134 is in a meshed driving relationship with gear teeth 117 on both of the frames 70 and 71 when the gear shaft 122 is in the outer position, thereby causing co-rotation of the frames 70 and 71 as shown by the arrows in FIG. 5A. When the gear shaft 122 is moved to the inner position illustrated in FIG. 5B, the drive gear 134 is in a meshed driving relationship only with the gear teeth 117 on frame 70. However, when in this latter position, the drive gear 134 also is in a meshed driving relationship with respect to gear 155 on shaft 125, which in turn is in meshed driving relationship with respect to gear 156 on shaft 126, which in turn is in a meshed driving relationship with respect to gear 157 on shaft 127, which in turn is in a meshed driving relationship with respect to gear teeth 117 on frame 71. The directions of rotation of gears 134, 155, 156 and 157 and the frames 70 and 71 are shown by the arrows in FIG. 5B thereby causing countercurrent rotation of frames 70 and 71.

Figure 6A:
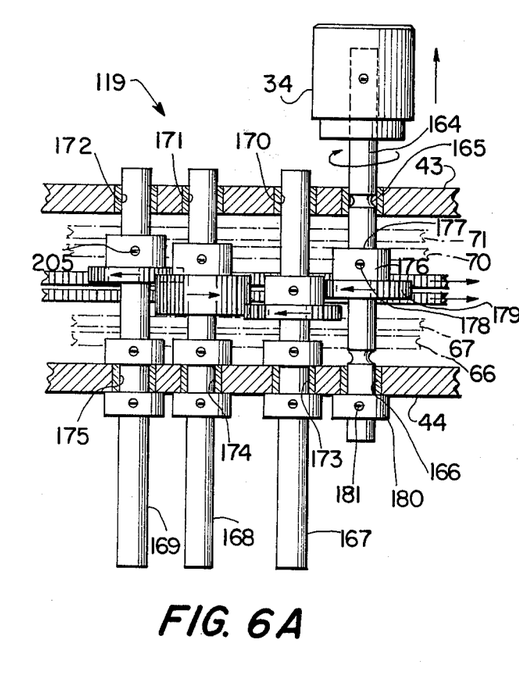
FIG. 6A is a fragmentary cross-sectional view in elevation taken along the line 6A—6A of FIG. 3 and illustrating the control knob in the "out" position.
Figure 6B:
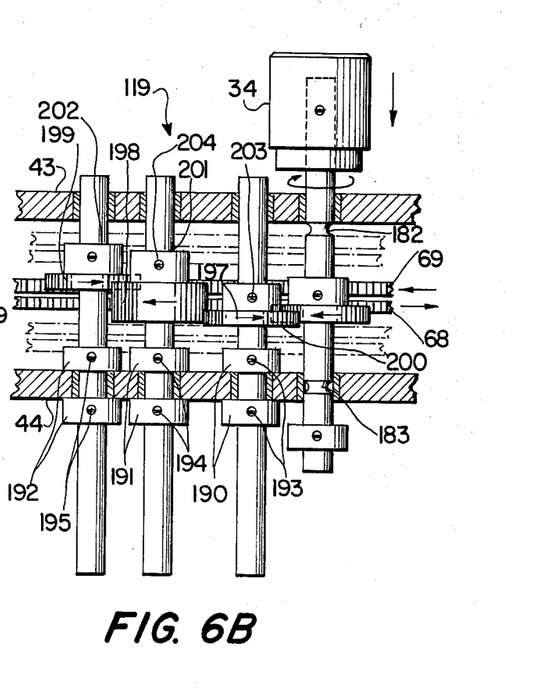
FIG. 6B is a view similar to FIG. 6A, with the exception of illustrating the contol knob in the "in" position.
Figure 12:
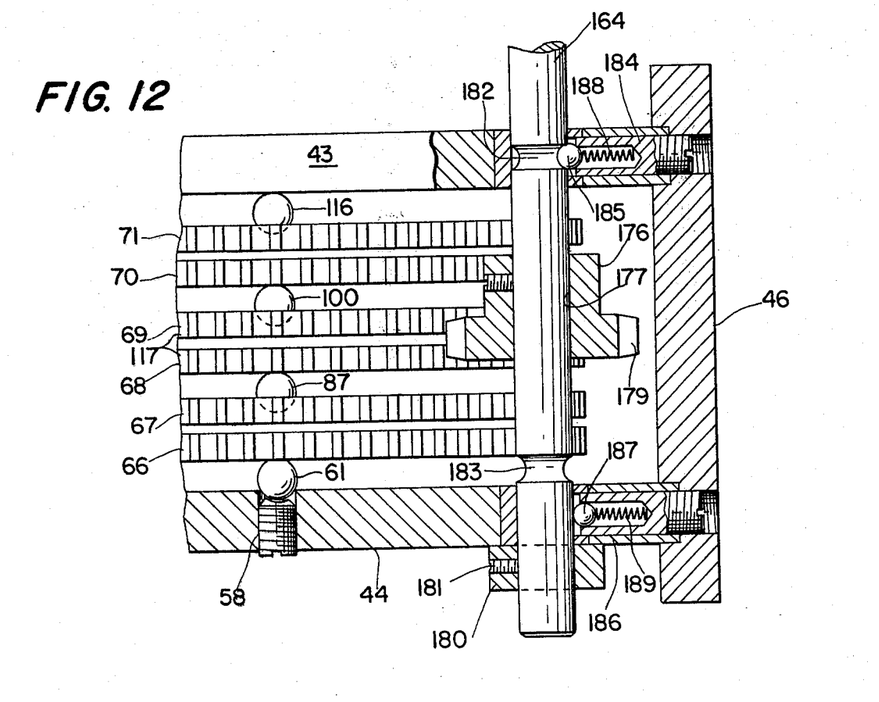
FIG. 12 is a fragmentary cross-sectional view in elevation taken along the line 12—12 of FIG. 3.

Referring now to FIGS. 6A, 6B and 12, the gear cluster 119 includes a drive gear shaft 164 rotatably mounted in openings 165 and 166 in plates 43 and 44, respectively, and 3 additional gear shafts 167, 168 and 169 rotatably mounted in spaced openings 170, 171 and 172 in plate 43 and spaced openings 173, 174 and 175 in plate 44, respectively. The drive gear shaft 164 is provided with a drive gear 176 having an opening 177 therein to receive shaft 164 and allow vertical adjustment. The drive gear 176 is provided with a set screw 178 for retaining it on gear shaft 164 in a desired position. The drive gear 176 has gear teeth 179 which, depending upon the position of gear shaft 164, are in a meshed driving relationship with the gear teeth 117 on both of frames 68 and 69, as shown in FIGS. 6A and 12, or in a meshed driving relationship only with the gear teeth 117 on frame 68, as illustrated in FIG. 6B. The shaft 164 has a control knob 34 mounted on the upper or outer end thereof, and a collar 180 provided with a set screw 181 for retaining it in the illustrated position. The shaft 164 is also provided with upper and lower annular recesses 182 and 183, respectively. A spring urged ball plunger 184 having a retaining ball 185 is mounted in plates 43 and 45, and a similar ball plunger 186 having a retaining ball 187 is mounted in plates 44 and 45. When the shaft 164 is moved to the up or outer position illustrated in FIG. 6A, the retaining ball 185 is urged by spring 188 into annular recess 182 thereby retaining the shaft 164 in the outer position. Similarly, when the shaft 164 is moved to the down or in position illustrated in FIG. 6B, the spring 189 urges ball 187 into annular recess 183 and retains shaft 164 in this position.

The gear shafts 167, 168 and 169 are provided with spaced pairs of collars 190, 191 and 192 which are retained in the illustrated positions by set screws 193, 194 and 195, respectively, and prevent inner or outer movement of shafts 167, 168 and 169. Gears 197, 198 and 199 have openings 200, 201 and 202 therein for adjustably receiving shafts 167, 168 and 169, respectively. The gears 197, 198 and 199 are provided with set screws 203, 204 and 205 for retaining the same on shafts 167, 168 and 169, respectively.

As is best seen in FIGS. 6A and 12, the drive gear 176 is in a meshed driving relationship with gear teeth 117 on both of the frames 68 and 69 when the gear shaft 164 is in the outer position, thereby causing co-rotation of the frames 68 and 69 as shown by the arrows in FIG. 6A. When the gear shaft 164 is moved to the inner position illustrated in FIG. 6B, the drive gear 176 is in a meshed driving relationship only with the gear teeth 117 on frame 68. However, when in this latter position, the drive gear 176 also is in a meshed driving relationship with respect to gear 197 on shaft 167, which in turn is in a meshed driving relationship with respect to gear 198 on shaft 168, which in turn is in a meshed driving relationship with respect to gear 199 on shaft 169, which in turn is in meshed driving relationship with respect to gear teeth 117 on frame 69. The directions of rotation of gears 176, 197, 198 and 199 and the frames 68 and 69 are shown by the arrows in FIG. 6B, thereby causing countercurrent rotation of frames 68 and 69.

Figure 7A:
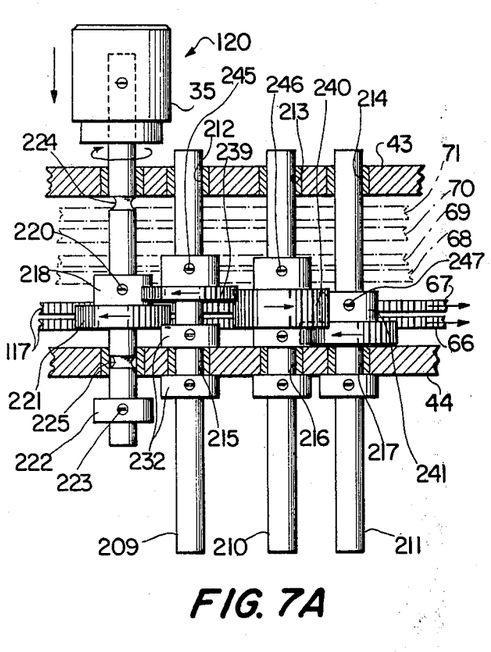
FIG. 7A is a fragmentary cross-sectional view in elevation taken along the line 7A—7A of FIG. 3 and illustrating the control knob in the "in" position.
Figure 7B:
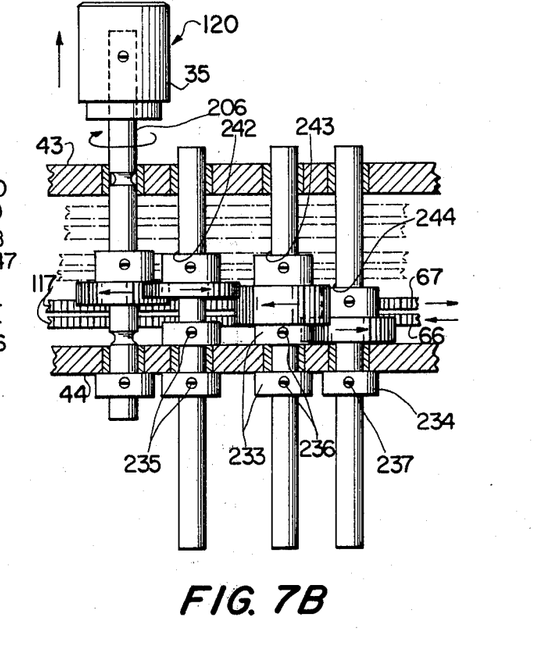
FIG. 7B is a view similar to FIG. 7A, with the exception of illustrating the control knob in the "out" position.
Figure 8:
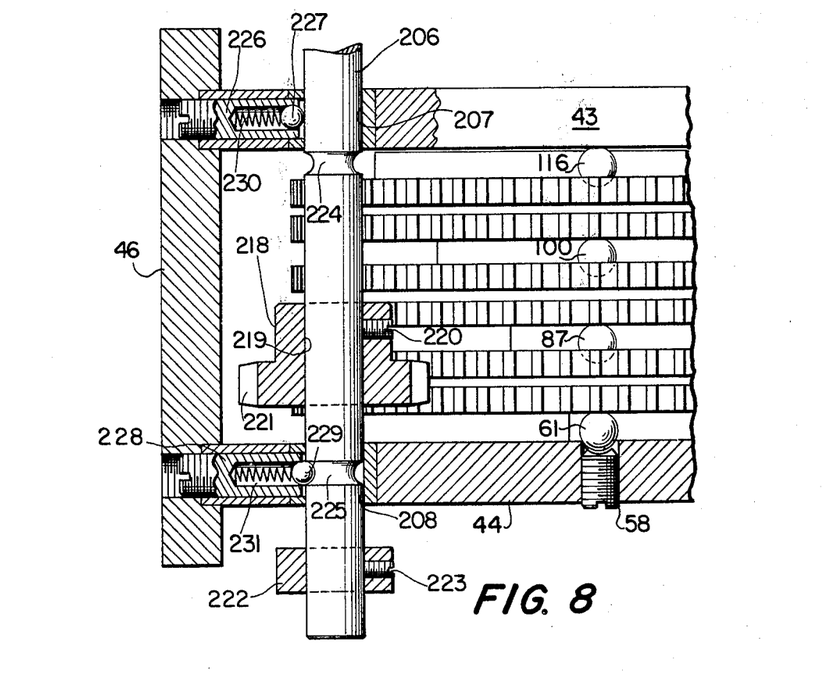
FIG. 8 is a fragmentary cross-sectional view taken along the line 8—8 of FIG. 3.

Referring now to FIGS. 7A, 7B and 8, the gear cluster 120 includes a drive gear shaft 206 rotatably mounted in openings 207 and 208 in plates 43 and 44, respectively, and 3 additional gear shafts 209, 210 and 211 rotatably mounted in spaced openings 212, 213 and 214 in plate 43 and spaced openings 215, 216, and 217 in plate 44, respectively. The drive gear shaft 206 is provided with a drive gear 218 having an opening 219 therein to receive shaft 206 and allow vertical adjustment. The drive gear 218 is provided with a set screw 220 for retaining it on gear shaft 206 in a desired position. The drive gear 218 has gear teeth 221 which, depending upon the position of gear shaft 206, are in a meshed driving relationship with the gear teeth 117 on both of frames 66 and 67, as shown in FIGS. 7A and 8, or in a meshed driving relationship with the gear teeth 117 only on frame 67, as is illustrated in FIG. 7B. The shaft 206 has a control knob 35 mounted on the upper or outer end thereof, and a collar 222 provided with a set screw 223 for retaining it in the illustrated position. The gear shaft 206 is also provided with upper and lower annular recesses 224 and 225 respectively. A spring urged ball plunger 226 having a retaining ball 227 is mounted in plates 43 and 45, and a similar ball plunger 228 having a retaining ball 229 is mounted in plates 44 and 45. When the shaft 206 is moved to the up or outer position illustrated in FIG. 7B, the retaining ball 227 is urged by spring 230 into annular recess 224 thereby retaining the shaft 206 in the outer position. Similarly, when the shaft 206 is moved to the down or in position illustrated in FIG. 7A, the spring 231 urges ball 229 into annular recess 225 and retains shaft 206 in this position.

The gear shafts 209, 210 and 211 are provided with spaced pairs of collars 232, 233 and 234, respectively, which are retained in the illustrated positions by set screws 235, 236 and 237, respectively, and prevent inner or outer movement of shafts 209, 210 and 211. Gears 239, 240 and 241 have openings 242, 243 and 244 therein for adjustably receiving shafts 209, 210 and 211, respectively. The gears 239, 240 and 241 are provided with set screws 245, 246 and 247 for retaining the same on shafts 209, 210 and 211, respectively.

As is best seen in FIGS. 7A and 8, the drive gear 218 is in a meshed driving relationship with gear teeth 117 on both of the frames 66 and 67 when the gear shaft 206 is in the inner position, thereby causing co-rotation of the frames 66 and 67 as shown by the arrows in FIG. 7A. When the gear shaft 206 is moved to the outer position illustrated in FIG. 7B, the drive gear 218 is in a meshed driving position only with the gear teeth 117 on frame 67. When in this latter position, the drive gear 218 also is in a meshed driving relationship with respect to gear 239 on shaft 209, which in turn is in meshed driving relationship with respect to gear 240 on shaft 210, which in turn is in a meshed driving relationship with respect to gear 241 on shaft 211, which in turn is in meshed driving relationship with respect to gear teeth 117 on frame 66. The direction of rotation of gears 218, 239, 240 and 241 and the frames 66 and 67 are shown by the arrows in FIG. 7B, thereby causing countercurrent rotation of frames 66 and 67.

Figure 9:
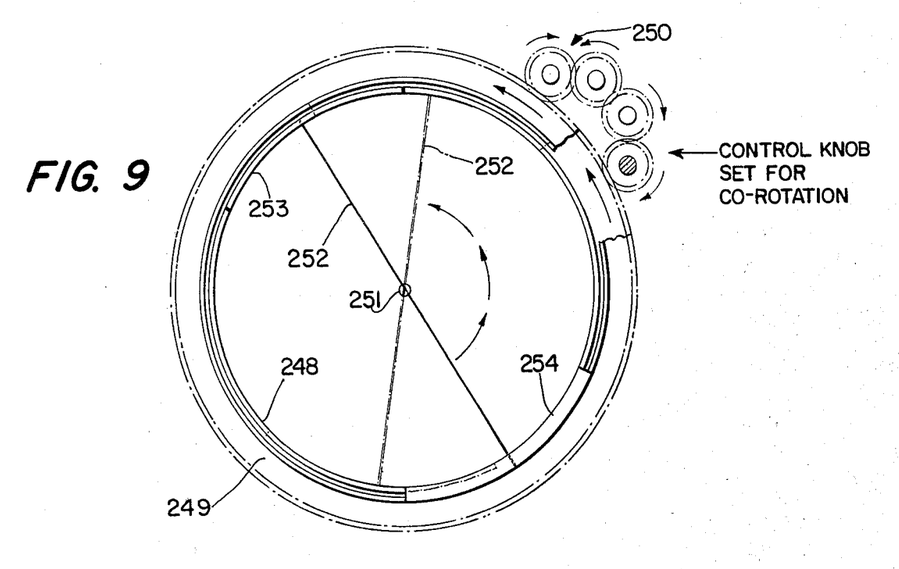
FIG. 9 is a schematic view illustrating the operation of the line indicating apparatus of the invention when the control knob is in the position for co-rotation of a pair of nestled circular frames supporting the line indicator.
Figure 10:
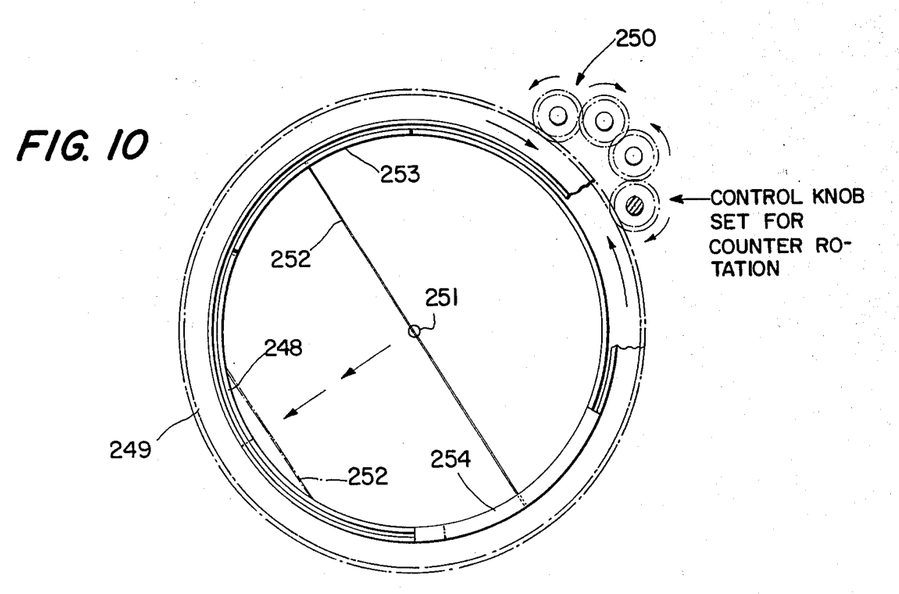
FIG. 10 is a view similar to FIG. 9, but illustrating the control knob in the position for counter-rotation of the pair of nestled circular frames supporting the line indicator.

FIGS. 9 and 10 are schematic views illustrating operation of a pair of cooperating frames 248 and 249 which is rotatable around common axis 251 either cocurrently as illustrated in FIG. 9, or countercurrently as illustrated in FIG. 10, by means of a cluster of gears generally designated as 250. An elastic line indicator 252 is suspended from upright projection 253 on frame 248 and upright projection 254 on frame 249. When line indicator 252 passes through common axis 251, the common axis 251 is equidistant from the suspended points of attachment to projections 253 and 254. When the pair of cooperating frames 248 and 249 is co-rotated by gear cluster 250 as illustrated in FIG. 9, the line indicator 252 is rotated around the common axis 251 from the position shown in solid line to the position shown in phantom line. When the pair of cooperating frames 248 and 249 is counterrotated by means of gear cluster 250 as illustrated in FIG. 10, then the line indicator 252 is moved perpendicular to its linear axis in the direction shown by the arrows from the position shown in solid line to the position shown in phantom line. It is apparent that each pair of cooperating frames 56 and 67, 68 and 69, and 70 and 71 is capable of being either cocurrently and/or countercurrently rotated by means of gear clusters 118, 119 and 120 respectively whereby the line indicators 84, 98 and 111 are separately movable either in a direction perpendicular to their linear axes and/or rotated around the common axis 60. Inasmuch as each set of cooperating frames, gear clusters and line indicators may be moved in either direction independently of the others, it is apparent that the line indicators 84, 198 and 111 may be moved to any desired position to represent lines of position and/or to determine bearings between two points on a chart or chart image as described hereinbefore.

The apparatus 22 of the invention may be installed in apparatus such as that described in my U.S. Pat. No. 3,865,477, or in other prior art apparatus including visual display devices in general such as radar screens or scopes, rear image projectors and other types of projection systems. The apparatus 22 also may be operated in conjunction with such apparatus as described in my U.S. Pat. No. 3,865,477, the disclosure of which is incorporated herein by reference.

The foregoing detailed description and the accompanying drawings are for purposes of illustration only, and are not intended as being limiting to the spirt or scope of the appended claims.

I claim:

1. Apparatus for indicating a line comprising
   a support means,
   plural means for indicating a line, and
   plural means carried by the said support means for mounting the said line indicating means and altering the relative position thereof,
   each of the said plurality of line indicating means including a movable and rotatable suspended elongated line indicator having a linear axis and first and second end portions, each of the said plurality of mounting and position altering means including first rotatable suspension means rotatably carried by the said support means for supporting the said first end portion of a given line indicator and second rotatable suspension means rotatably carried by the said support means for supporting the said second end portion of the said given line indicator, each of the said line indicators being suspended between their respective said first and second suspension means and each of the said first and second suspension means being rotatable around a common axis, the said mounting and position altering means including means carried by the said support means for rotating each of the said first and second suspension means around the said common axis, the said rotating means including means for co-rotating each of the said first and second suspension means and means for counter-rotating each of the said first and second suspension means, the respective said first and second suspension means for each of the said suspended line indicators including means cooperating therewith for varying the effective suspended length of each of the line indicators as the said first and second suspension means are counter-rotated by the said counter-rotating means, each of the said line indicators being suspended by its respective said first and second suspension means whereby it is movable in a direction substantially perpendicular to the said linear axis and whereby it is also rotatable around the said common axis, the said first and second rotatable suspension means for a given suspended line indicator including means for moving the said given suspended line indicator in a direction substantially perpendicular to the said linear axis when the said first and second suspension means therefor are counter-rotated by the said counter-rotating means, the said common axis being angularly disposed with respect to the said linear axis and also being angularly disposed with respect to the direction of movement of the said given suspended line indicator by the said means for moving the said given suspended line indicator, the said first and second suspension means for the said given suspended line indicator including means for rotating the said given suspended line indicator around the said common axis when the said first and second suspension means therefor are co-rotated, each of the said suspended line indicators being suspended by its respective said first and second suspension means whereby when it is moved to a desired position by the said moving means the said common axis is substantially perpendicular to the said linear axis and is also substantially perpendicular to the direction of movement of the line indicator by the said moving means, each of the said suspended line indicators being movable in a fixed plane by the said moving means and being rotatable in substantially the same fixed plane by the said line indicator rotating means, each of the said suspended line indicators being movable by the said moving means to a position whereby the said common axis passes through the said linear axis and when a given line indicator is in this position the said common axis passes through the said linear axis at a point substantially equidistant the ends of the suspended length of the said given line indicator, and a plurality of the said line indicating means being carried by the said mounting and position altering means in a superimposed nestled relationship, the resultant plurality of the said line indicators thereof being suspended by their respective said first and second suspension means in a closely adjacent superimposed nestled relationship, and the said line indicators being moved by their respective said moving means and being rotated by their respective said line indicator rotating means in their respective closely adjacent superimposed fixed planes to positions wherein they are angularly disposed with respect to each other.

2. Apparatus for indicating a line comprising a support means,
plural means for indicating a line, and
plural means carried by the said support means for mounting the said line indicating means and altering the relative position thereof,
each of the said plurality of line indicating means including a movable and rotatable suspended elongated line indicator having a linear axis and first and second end portions, each of the said plurality of mounting and position altering means including first rotatable suspension means rotatably carried by the said support means for supporting the said first end portion of a given line indicator and second rotatable suspension means rotatably carried by the said support means for supporting the said second end portion of the said given line indicator, each of the said line indicators being suspended between their respective said first and second suspension means and each of the said first and second suspension means being rotatable around a common axis, the said mounting and position altering means including means carried by the said support means for rotating each of the said first and second suspension means around the said common axis, the said rotating means including means for co-rotating each of the said first and second suspension means and means for counter-rotating each of the said first and second suspension means, the respective said first and second suspension means for each of the said suspended line indicators including means cooperating therewith for varying the effective suspended length of each of the line indicators as the said first and second suspension means are counter-rotated by the said counter-rotating means, each of the said line indicators being suspended by its respective said first and second suspension means whereby it is movable in a direction substantially perpendicular to the said linear axis and whereby it is also rotatable around the said common axis, the said first and second rotatable suspension means for a given suspended line indicator including means for moving the said given suspended line indicator in a direction substantially perpendicular to the said linear axis when the said first and second suspension means therefor are counter-rotated by the said counter-rotating means, the said common axis being angularly disposed with respect to the said linear axis and also being angularly disposed with respect to the direction of movement of the said given suspended line indicator by the said means for moving the said given suspended line indicator, the said first and second suspension means for the said given suspended line indicator including means for rotating the said given suspended line indicator around the said commom axis when the said first and second suspension means therefor are co-rotated, each of the said suspended line indicators being suspended by its respective said first and second suspension means whereby when it is moved to a desired position by the said moving means the said common axis is substantially perpendicular to the said linear axis and is also substantially perpendicular to the direction of movement of the line indicator by the said moving means, each of the said suspended lines indicators being movable in a fixed plane by the said moving means and being rotatable in substantially the same fixed plane by the said line indicator rotating means, each of the said suspended line indicators being movable by the said moving means to a position whereby the said common axis passes through the said linear axis and when a given line indicator is in this position the said common axis passes through the said linear axis at a point substantially equidistant the ends of the suspended length of the said given line indicator, and the said rotatable first and second suspension means being respectively rotatably nestled first and second substantially circular frames of a relative size and configuration whereby they may be rotatably nestled together in a closely adjacent relationship.

3. The apparatus of claim 2 wherein first and second cooperating stop means are carried by the rotatable first and second circular frames respectively, the first and second stop means cooperating to allow counter-rotation of the first and second circular frames around the said common axis through an arc of less than 180° in either direction.

4. The apparatus of claim 2 wherein the said first end portion of the line indicator is supported on the first circular frame by the said first stop means and the said second end portion of the line indicator is supported on the second circular frame by the said second stop means.

5. The apparatus of claim 4 wherein the linear distance between the first and second stop means varies as the first and second circular frames are counter-rotated around the said common axis, and the line indicator is formed of an elongated piece of elastic material of a length and degree of elasticity whereby during counter-rotation of the first and second circular frames around the said common axis the line indicator remains tautly suspended between the first and second stop means.

6. The apparatus of claim 4 wherein a plurality of the said line indicating means are carried by the said mounting and position altering means in a superimposed nestled relationship, the resultant plurality of the said line indicators thereof are suspended by their respective said first and second suspension means in a closely adjacent superimposed nestled relationship, and the line indicators are moved by their respective said moving means and are rotated by their respective said line indicator rotating means in their respective closely adjacent superimposed fixed planes to positions wherein they are angularly disposed with respect to each other.

7. The apparatus of claim 6 wherein the linear distance between the first and second stop means varies as the first and second circular frames are counter-rotated around the said common axis, and the line indicator is formed of an elongated piece of elastic material of a length and degree of elasticity whereby during counter-rotation of the first and second circular frames around the said common axis the line indicator remains tautly suspended between the first and second stop means.

8. The apparatus of claim 2 wherein the first and second circular frames include rotatably mounted ring-like first and second frame portions respectively, the said first and second frame portions being mounted in a superimposed relationship and each being rotatable around the said common axis, the said first frame portion having first inner and first outer peripheral edge portions with reference to the said common axis and a visually unobstructed first area within the said first inner peripheral edge portion, the said second frame portion having second inner and second outer peripheral edge portions with reference to the said common axis and a visually unobstructed second area within the said second inner peripheral edge portion, the said first inner peripheral edge portion having a first projection extending outward therefrom, the said second inner peripheral edge portion having a second projection extending outward therefrom, the said first and second projections extending outward from their respective inner peripheral edge portions in the same general direction, the said first end portion of the line indicator being supported on the said first circular frame by the said first projection, the said second end portion of the line indicator being supported on the said second circular frame by the said second projection, the supported line indicator extending between the said first and second projections and across the said visually unobstructed first and second areas, and the said first and second projections cooperating to provide stop means and thereby allow counter-rotation of the first and second circular frames around the said common axis through an arc of less than 180° in either direction.

9. The apparatus of claim 8 wherein a plurality of the said line indicating means are carried by the said mounting and position altering means in a superimposed nestled relationship, the resultant plurality of the said line indicators thereof are suspended by their respective said first and second suspension means in a closely adjacent superimposed nestled relationship, and the said line indicators are moved by their respective said moving means and are rotated by their respective said line indicator rotating means in their respective closely adjacent superimposed fixed planes to positions wherein they are angularly disposed with respect to each other.

10. The apparatus of claim 9 wherein the linear distance between the first and second projections varies as the first and second circular frames are counter-rotated around the said common axis, and the line indicator is formed of an elongated piece of elastic material of a length and degree of elasticity whereby during counter-rotation of the first and second circular frames around the said common axis the line indicator remains tautly suspended between the first and second projections.

11. The apparatus of claim 8 wherein the means for rotating the first and second circular frames around the common axis includes a rotatable drive means rotatably carried by the said support means, the drive means having at least one generally circular driving surface and an axis of rotation which is substantially parallel to the said common axis, the said first and second outer peripheral edge portions and the circular surface of the drive means being adapted to be engaged in a driving relationship, and the drive means being supported by the said support means whereby at least one circular driving surface thereof effectively engages the said first and second outer peripheral edge portions in a driving relationship and the said first and second frame portions are thereby rotated when the drive means is rotated.

12. The apparatus of claim 11 wherein the said drive means includes a plurality of circular driving surfaces and means for moving the said circular driving surfaces axially between first and second positions, whereby a given circular driving surface of the said plurality thereof engages no more than one of the said first and second outer peripheral edge portions in a driving relationship in the said first axial position and engages both of the said first and second outer peripheral edge portions in a driving relationship in the said second axial position.

13. The apparatus of claim 12 wherein the said plurality of circular driving surfaces of the drive means are mounted on shafts, the said shafts are movable axially between the said first and second axial positions, and retaining means is provided for retaining the said shafts in either one of the said first and second axial positions.

14. The apparatus of claim 12 wherein a second rotatable drive means is rotatably carried by the said support means, the said second drive means having at least one generally circular driving surface and at least one generally circular driven surface and an axis of rotation which is substantially parallel to that of the rotational axis of the said first drive means and the said common axis, the second drive means having at least one driven surface adapted to be engaged in a driven relationship with at least one driving surface of the first drive means, the second drive means having at least one driving surface adapted to be engaged in a driving relationship with the said outer peripheral edge portion which is not engaged with the driving surface of the first driving means when the driving surface of the first driving means is moved axially to the said first position, the second drive means being supported by the said support means whereby at least one driven surface thereof effectively engages at least one driving surface of the first drive means in a driven relationship whereby the second drive means is rotated when the first drive means is rotated, the second drive means also being supported by the said support means whereby at least one driving surface thereof effectively engages in a driving relationship the undriven said outer peripheral edge portion which is not engaged with the driving surface of the first driving means when the driving surface of the first driving means is moved axially to the said first position and the frame portion having the said undriven outer peripheral edge portion is thereby rotated when the first drive means is rotated, the first drive means and the second drive means being adapted to counter-rotate in either direction the said first and second frame portions when the first drive means is rotated with the driving surface thereof moved axially to the said first position and to co-rotate in either direction the said first and second frame portion when the first drive means is rotated with the driving surface thereof moved axially to the said second position.

15. The apparatus of claim 14 wherein the linear distance between the first and second projections varies as the first and second circular frames are counter-rotated around the said common axis, and the line indicator is formed of an elongated piece of elastic material of a length and degree of elasticity whereby during counter-rotation of the first and second circular frames around the said common axis the line indicator remains tautly suspended between the first and second projections.

16. The apparatus of claim 15 wherein a plurality of the said line indicating means are carried by the said mounting and position altering means in a superimposed nestled relationship, the resultant plurality of the said line indicators thereof are suspended by their respective said first and second suspension means in a closely adjacent superimposed nestled relationship, and the said line indicators are moved by their respective said moving means and are rotated by their respective said line indicator rotating means in their respective closely adjacent superimposed fixed planes to positions wherein they are angularly disposed with respect to each other.

17. The apparatus of claim 16 wherein at least one circular driving surface of the drive means is mounted on a shaft, the said shaft is movable axially between the said first and second axial positions, and retaining means is provided for releasably retaining the said shaft in either one of the said first and second axial positions.

18. Apparatus for producing and visually displaying images of a plurality of line indicators comprising
a support means,
a plural means for indicating a line, and
plural means carried by the said support means for mounting the said line indicating means and altering the relative positions thereof,
each of the said plurality of line indicating means including a movable and rotatable suspended elongated line indicator having a linear axis and first and second end portions, each of the said plurality of mounting and position altering means including first rotatable suspension means rotatably carried by the said support means for supporting the said first end portion of a given line indicator and second rotatable suspension means rotatably carried by the said support means for supporting the said second end portion of the said given line indicator, each of the said line indicators being suspended between their respective said first and second suspension means and each of the said first and second suspension means being rotatable around a common axis, the said mounting and position altering means including means carried by the said support means for rotating each of the said first and second suspension means around the said common axis, the said rotating means including means for co-rotating each of the said first and second suspension means and means for counter-rotating each of the said first and second suspension means, the respective said first and second suspension means for each of the said suspended line indicators including means cooperating therewith for varying the effective suspended length of each of the line indicators as the said first and second suspension means are counter-rotated by the said counter-rotating means, each of the said line indicators being suspended by its respective said first and second suspension means whereby it is movable in a direction substantially perpendicular to the said linear axis and whereby it is also rotatable around the said common axis, the said first and second rotatable suspension means for a given suspended line indicator including means for moving the said given suspended line indicator in a direction substantially perpendicular to the said linear axis when the said first and second suspension means therefor are counter-rotated by the said counter-rotating means, the said common axis being angularly disposed with respect to the said linear axis and also being angularly disposed with respect to the direction of movement of the said given suspended line indicator by the said means for moving the said given suspended line indicator, the said first and second suspension means for the said given suspended line indicator including means for rotating the said given suspended line indicator around the said common axis when the said first and second suspension means therefor are co-rotated, each of the said suspended line indicators being suspended by its respective said first and second suspension means whereby when it is moved to a desired position by the said moving means the said common axis is substantially perpendicular to the said linear axis and is also substantially perpendicular to the direction of movement of the line indicator by the said moving means, each of the said suspended line indicators being movable in a fixed plane by the said moving means and being rotatable in substantially the same fixed plane by the said line indicator rotating means, and each of the said suspended line indicators being movable by the said moving means to a position whereby the said common axis passes through the said linear axis and when a given line indicator is in this position the said common axis passes through the said linear axis at a point substantially equidistant the ends of the suspended length of the said given line indicator,
means carried by the said support means for producing an image of at least a portion of the said line indicator, and
means carried by the said support means for visually displaying said image whereby it may be viewed by an operator of the said apparatus,
a plurality of the said line indicating means being carried by the said mounting and position altering means in a superimposed nestled relationship, the resultant plurality of the said line indicators thereof being suspended by their respective said first and second suspension means in a closely adjacent superimposed nestled relationship, and the said line indicators being moved by their respective said moving means and being rotated by their respective said line indicator rotating means in their respective closely adjacent superimposed fixed planes to positions wherein they are angularly disposed with respect to each other and a substantially distortion free image thereof is produced and visually displayed.

19. Apparatus for producing and visually displaying images of a plurality of line indicators comprising
a support means,
plural means for indicating a line, and
plural means carried by the said support means for mounting the said line indicating means and altering the relative positions thereof,
each of the said plurality of line indicating means including a movable and rotatable suspended elongated line indicator having a linear axis and first and second end portions, each of the said plurality of mounting and position altering means including first rotatable suspension means rotatably carried by the said support means for supporting the said first end portion of a given line indicator and second rotatable suspension means rotatably carried by the said support means for supporting the said second end portion of the said given line indicator, each of the said line indicators being suspended between their respective said first and second suspension means and each of the said first and second suspension means being rotatable around a common axis, the said mounting and position altering means including means carried by the said support means for rotating each of the said first and second suspension means around the said common axis, the said rotating means including means for co-rotating each of the said first and second suspension means and means for counter-rotating each of the said first and second suspension means, the respective said first and second suspension means for each of the said suspended line indicators including means cooperating therewith for varying the effective suspended length of each of the line indicators as the said first and second suspension means are counter-rotated by the said counter-rotating means, each of the said line indicators being suspended by its respective said first and second suspension means whereby it is movable in a direction substantially perpendicular to the said linear axis and whereby it is also rotatable around the said common axis, the said first and second rotatable suspension means for a given suspended line indicator including means for moving the said given suspended line indicator in a direction substantially perpendicular to the said linear axis when the said first and second suspension means therefore are counter-rotated by the said counter-rotating means, the said common axis being angularly disposed with respect to the said linear axis and also being angularly disposed with respect to the direction of movement of the said given suspended line indicator by the said means for moving the said given suspended line indicator, the said first and second suspension means for the said given suspended line indicator including means for rotating the said given suspended line indicator around the said common axis when the said first and second suspension means therefor are co-rotated, each of the said suspended line indicators being suspended by its respective said first and second suspension means whereby when it is moved to a desired position by the said moving means the said common axis is substantially perpendicular to the said linear axis and is also substantially perpendicular to the direction of movement of the line indicator by the said moving means, each of the said suspended line indicators being movable in a fixed plane by the said moving means and being rotatable in substantially the same fixed plane by the said line indicator rotating means, and each of the said suspended line indicators being movable by the said moving means to a position whereby the said common axis passes through the said linear axis and when a given line indicator is in this position the said common axis passes through the said linear axis at a point substantially equidistant the ends of the suspended length of the said given line indicator, means carried by the said support means for producing an image of at least a portion of the said line indicator, and means carried by the said support means for visually displaying said image whereby it may be viewed by an operator of the said apparatus, the said rotatable first and second suspension means being respectively rotatably nestled first and second substantially circular frames of a relative size and configuration whereby they may be rotatably nestled together in a closely adjacent relationship, the first and second circular frames including rotatably mounted ring-like first and second frame portions respectively, the said first and second frame portions being mounted in a superimposed relationship and each being rotatable around the said common axis, the said first frame portion having first inner and first outer peripheral edge portion with reference to the said common axis and a visually unobstructed first area within the said first inner peripheral edge portion, the said second frame portion having second inner and second outer peripheral edge portions with reference to the said common axis and a visually unobstructed second area within the said second inner peripheral edge portion, the said first inner peripheral edge portion having a first projection extending outward therefrom, the said second inner peripheral edge portion having a second projection extending outward thereform, the said first and second projections extending outward from their respective inner peripheral edge portions in the same general direction, the said first end portion of the line indicator being supported on the said first circular frame by the said first projection, the said second end portion of the line indicator being supported on the said second circular frame by the said second projection, the supported line indicator extending between the said first and second projections and across the said visually unobstructed first and second areas, and the said first and second projections cooperating to provide stop means and thereby allow counter-rotation of the first and second circular frames around the same common axis through an arc of less than 180° in either direction.

20. The apparatus of claim 17 wherein a plurality of the said line indicating means are carried by the said mounting and position altering means in a superimposed nestled relationship, the resultant plurality of the said line indicators thereof are suspended by their respective said first and second suspension means in a closely adjacent superimposed nestled relationship, and the said line indicators are moved by their respective said moving means and are rotated by their respective said line indicator rotating means in their respective closely adjacent superimposed fixed planes to positions whereby they are angularly disposed with respect to each other.

21. The apparatus of claim 19 wherein the linear distance between the first and second projections varies as the first and second circular frames are counter-rotated around the said common axis, and the line indicator is formed of an elongated piece of elastic material of a length and degree of elasticity whereby during counter-rotation of the first and second circular frames around the said common axis the line indicator remains tautly suspended between the first and second projections.

22. The apparatus of claim 21 wherein the means for rotating the first and second circular frames around the common axis includes a rotatable drive means rotatably carried by the said support means, the drive means having at least one generally circular driving surface and an axis of rotation which is substantially parallel to the said common axis, the said first and second outer peripheral edge portions and the circular surface of the drive means being adapted to be engaged in a driving relationship, and the drive means being supported by the said support means whereby at least one circular driving surface thereof effectively engages the said first and second outer peripheral edge portions in a driving relationship and the said first and second frame portions are thereby rotated when the drive means is rotated.

23. The apparatus of claim 22 wherein the said drive means includes a plurality of circular driving surfaces and means for moving the said circular driving surfaces axially between first and second positions, whereby a given circular driving surface of the said plurality thereof engages no more than one of the said first and second outer peripheral edge portions in a driving relationship in the said first axial position and engages both of the said first and second outer peripheral edge portions in a driving relationship in the said second axial position.

24. The apparatus of claim 23 wherein the said plurality of circular driving surfaces of the drive means are mounted on shafts, the said shafts are movable axially between the said first and second axial positions, and retaining means is provided for retaining the said shafts in either one of the said first and second axial positions.

25. The apparatus of claim 24 wherein a second rotatable drive means is rotatably carried by the said support means, the said second drive means having at least one generally circular driving surface and at least one generally circular driven surface and an axis of rotation which is substantially parallel to that of the rotational axis of the said first drive means and the said common axis, the second drive means having at least one driven surface adapted to be engaged in a driven relationship with at least one driving surface of the first drive means, the second drive means having at least one driving surface adapted to be engaged in a driving relationship with the said outer peripheral edge portion which is not engaged with the driving surface of the first driving means when the driving surface of the first driving means is moved axially to the said first position, the second drive means being supported by the said support means whereby at least one driven surface thereof effectively engages at least one driving surface of the first drive means in a driven relationship whereby the second drive means is rotated when the first drive means is rotated, the second drive means also being supported by the said support means whereby at least one driving surface thereof effectively engages in a driving relationship the undriven said outer peripheral edge portion which is not engaged with the driving surface of the first driving means when the driving surface of the first driving means is moved axially to the said first position and the frame portion having the said undriven outer peripheral edge portion is thereby rotated when the firstdrive means is rotated, the first drive means and the second drive means being adapted to counter-rotate in either direction the said first and second frame portions when the first drive means is rotated with the driving surface thereof moved axially to the said first position and to co-rotate in either direction the said first and second frame portions when the first drive means is rotated with the driving surface thereof moved axially to the said second position.

26. The apparatus of claim 25 wherein the linear distance between the first and second projections varies as the first and second circular frames are counter-rotated around the said common axis, and the line indicator is formed of an elongated piece of elastic material of a length and degree of elasticity whereby during counter-rotation of the first and second circular frame around the said common axis the line indicator remains tautly suspended between the first and second projections.

27. The apparatus of claim 26 wherein a plurality of the said line indicating means are carried by the said mounting and position altering means in a superimposed nestled relationship, the resultant plurality of the said line indicators thereof are suspended by their respective said first and second suspension means in a closely adjacent superimposed nestled relationship, and the said line indicators are moved by their respective said moving means and are rotated by their respective said line indicator rotating means in their respective closely adjacent superimposed fixed planes to positions wherein they are angularly disposed with respect to each other.

28. The apparatus of claim 27 wherein at least one circular driving surface of the drive means is mounted on a shaft, the said shaft is movable axially between the said first and second axial positions, and retaining means is provided for releasably retaining the said shaft in either one of the said first and second axial position.

* * * * *